Patented Aug. 3, 1943

2,325,946

UNITED STATES PATENT OFFICE 2,325,946

SOFTENING SYNTHETIC RUBBER

Benjamin S. Garvey, Jr., Akron, Ohio, assignor to The B. F. Goodrich Company, New York, N. Y., a corporation of New York No Drawing. Application March 26, 1941, Serial No. 385,301

6 Claims. (Cl. 260—36)

This invention relates to the softening of synthetic rubber and to a new class of softeners which produce a great increase in plasticity when incorporated in unvulcanized synthetic rubber.

The softening of synthetic rubber has in general presented problems not encountered in the softening of natural rubber due to different behavior on mill rolls, incompatibility of synthetic rubber with certain softening materials commonly employed in natural rubber and other differences in properties. While the problem of satisfactorily softening synthetic rubber has been particularly difficult in the case of copolymers of butadiene and acrylonitrile, other synthetic rubbers prepared by the polymerization of conjugated dienes have also presented problems. The difficulty has been increased by the fact that softeners for one type of synthetic rubber do not in all cases function similarly in other types of synthetic rubber. Even varying the proportions of the monomers in the mixtures employed to form copolymers has necessitated the search for new softeners for the synthetic rubber product.

I have discovered that di-2-ethylhexyl phthalate is an excellent softener for synthetic rubber, and that this material imparts to synthetic rubber certain desirable properties which do not accompany the use of softeners in general or even of other softeners derived from phthalic acid.

Di-2-ethylhexyl phthalate may be incorporated into synthetic rubber by any desired method as by adding the softener to synthetic rubber while the rubber is being worked on a roll mill, masticating a mixture of rubber and the softener in an internal mixer, or adding the softener to a solution or dispersion of the synthetic rubber.

Di-2-ethylhexyl phthalate may be employed as a softener for synthetic rubber prepared by the polymerization of a conjugated butadiene such as butadiene-1,3 which is commonly called butadiene, isoprene, chloroprene, piperylene, 2,3-dimethyl butadiene, etc., either alone or in admixture with each other or with olefinic monomers copolymerizable therewith such as styrene, vinyl benzene, isobutylene, acrylonitrile, methyl methacrylate, methyl ethyl ketone, vinylidene chloride, methyl vinyl ether, and other olefinic hydrocarbons, esters, ketones, and ethers. The polymerization to form a synthetic rubber may be effected by any of the well-known methods known to the art such as homogeneous polymerization, polymerization in an aqueous emulsion, etc.

As a specific example, a batch consisting of 100 parts by weight of a synthetic rubber prepared by copolymerizing in aqueous emulsion 55 parts of butadiene and 45 parts of acrylonitrile was broken down on a roll mill at 120–130° F. 50 parts of di-2-ethylhexylphthalate were then added as fast as the softener was absorbed by the copolymer. The conventional pigments, sulfur, and an accelerator were then added, and dispersed well in the softened composition. The composition had some tack, but when brushed with an organic solvent such as acetone, ethyl acetate, methyl ethyl ketone, chloroform, chlorotoluene, or isopropyl chloride, for instance, the composition developed good tack. The development of tack when a solvent is brushed on the composition appears to be at least partly a function of the softener employed, for the substitution of many other softeners for the di-2-ethylhexyl phthalate in the above composition results in the production of a stock which does not develop a satisfactory tack when brushed with a solvent.

When the above compounded composition was cured, a vulcanizate having excellent tensile strength and elongation was produced. The vulcanizate also possessed a low durometer hardness which renders it particularly useful in specialized uses such as the manufacture of printing rolls.

In another experiment, 50 parts of di-2-ethylhexyl phthalate were incorporated in 100 parts of a synthetic rubber prepared by copolymerizing in aqueous emulsion 75 parts of butadiene and 25 parts of acrylonitrile. The unvulcanized composition developed a good tack when brushed with a solvent, and the vulcanizate was particularly useful because of its low durometer hardness. Di-2-ethylhexyl phthalate has also been successfully employed to soften copolymers of butadiene and methyl methacrylate and copolymers of butadiene and styrene.

Other materials such as natural rubber, other softeners, pigments, fillers, vulcanizing agents, accelerators, antioxidants, and the like may be included in the compositions herein described.

Although I have disclosed specific embodiments of my invention, I do not intend to limit the invention solely thereto, for many variations and modifications are within the spirit and scope of the invention as defined in the appended claims.

I claim:

1. A composition of matter comprising di-2-ethylhexyl phthalate and a rubbery copolymer of butadiene-1,3 and acrylonitrile.

2. A composition of matter comprising di-2-ethylhexyl phthalate and a rubbery emulsion copolymer of about 55 parts of butadiene-1,3 and 45 parts of acrylonitrile.

3. A composition of matter comprising di-2-ethylhexyl phthalate and a rubbery copolymer of butadiene-1,3 and methyl methacrylate.

4. A composition of matter comprising di-2-ethylhexyl phthalate and a rubbery copolymer of butadiene-1,3 and styrene.

5. A composition of matter comprising di-2-ethylhexyl phthalate and a rubbery copolymer of butadiene-1,3 and a mono-olefinic compound.

6. A composition of matter comprising di-2-ethylhexyl phthalate and a rubbery polymer of a conjugated butadiene.

BENJAMIN S. GARVEY, Jr.